(12) United States Patent  
Vijayrao et al.

(10) Patent No.: US 9,377,958 B2  
(45) Date of Patent: Jun. 28, 2016

(54) ALLOCATION OF READ/WRITE CHANNELS FOR STORAGE DEVICES

(71) Applicant: Facebook, Inc., Menlo Park, CA (US)

(72) Inventors: Narsing Vijayrao, Santa Clara, CA (US); Hongzhong Jia, Cupertino, CA (US); Jason Taylor, Berkeley, CA (US)

(73) Assignee: Facebook, Inc., Menlo Park, CA (US)

( * ) Notice: Subject to any disclaimer, the term of this patent is extended or adjusted under 35 U.S.C. 154(b) by 56 days.

(21) Appl. No.: 14/457,864

(22) Filed: Aug. 12, 2014

(65) Prior Publication Data

US 2016/0048345 A1    Feb. 18, 2016

(51) Int. Cl.  
*G06F 13/28*  (2006.01)  
*G06F 3/06*   (2006.01)

(52) U.S. Cl.  
CPC ............ *G06F 3/0613* (2013.01); *G06F 3/0659* (2013.01); *G06F 3/0683* (2013.01); *G06F 3/06* (2013.01); *G06F 3/061* (2013.01)

(58) Field of Classification Search  
CPC ... G06F 3/0613; G06F 3/0659; G06F 3/0683; G06F 3/06; G06F 3/061  
See application file for complete search history.

(56) References Cited

U.S. PATENT DOCUMENTS

| | | | | |
|---|---|---|---|---|
| 4,207,609 A  * | 6/1980 | Luiz | ........................ | G06F 11/14 710/38 |
| 5,269,011 A  * | 12/1993 | Yanai | ....................... | G06F 15/17 703/24 |
| 5,862,014 A  * | 1/1999 | Nute | ......................... | G11B 5/48 360/261.1 |
| 6,728,770 B1 * | 4/2004 | Bradford | ............. | H04L 12/2602 709/226 |
| 7,783,663 B2 * | 8/2010 | Allen | ..................... | G06F 3/0613 707/782 |
| 2003/0041298 A1 * | 2/2003 | Bruner | ............... | G11B 20/1866 714/763 |
| 2006/0095468 A1 * | 5/2006 | Allen | ..................... | G06F 3/0613 |
| 2007/0067528 A1 * | 3/2007 | Schaffer | ................ | G06F 13/362 710/116 |
| 2009/0045989 A1 * | 2/2009 | Esumi | .............. | G11B 20/10009 341/58 |
| 2010/0070656 A1 * | 3/2010 | Snell | ..................... | G06F 3/0613 710/5 |
| 2010/0088469 A1 * | 4/2010 | Motonaga | ............. | G06F 3/0613 711/113 |
| 2014/0185376 A1 * | 7/2014 | Sinclair | .................. | G11C 16/10 365/185.03 |
| 2015/0242134 A1 * | 8/2015 | Takada | ..................... | G06F 3/061 711/114 |

* cited by examiner

*Primary Examiner* — Jing-Yih Shyu  
(74) *Attorney, Agent, or Firm* — Perkins Coie LLP

(57) ABSTRACT

Channel performance can be improved in a storage device, such as a flash memory or a flash-based solid state drive, by dynamically provisioning available data channels for both write and read operations. In one aspect, a set of available data channels on a storage device is partitioned into a set of write channels and a set of read channels according to a read-to-write ratio. Next, when an incoming data stream of mixed read requests and write requests arrives at the storage device, the allocated read channels process the read requests on a first group of memory blocks, which does not include garbage collection and write amplification on the first group of memory blocks. In parallel, the allocated write channels process the write requests on a second group of memory blocks, which does include garbage collection and write amplification on the second group of memory blocks.

20 Claims, 5 Drawing Sheets

ALLOCATION OF READ/WRITE CHANNELS FOR STORAGE DEVICES

TECHNICAL FIELD

The disclosed embodiments are directed to improving channel performance in a storage device, such as a flash memory or a solid state drive.

BACKGROUND

Solid state drives (SSD) based on flash memory are gradually replacing disk drives as the preferred data storage media in some data storage devices, storage arrays such as storage area network (SAN) arrays. In a data storage device ("storage device") based on flash memory, memory cells are organized into units of pages and blocks, wherein each memory block is typically made up of multiple pages. Although data can be written to unused (free) pages, previously written pages cannot be directly overwritten. Instead, to free up previously written (stale) pages within a memory block, the entire block is erased. Before erasing a block, pages with valid data within the block are read and rewritten into another block having free pages, e.g., with the additional (overwriting) data. The original block is subsequently erased and all pages within the block become free pages available for writing. This process is referred to as "garbage collection," which is one of the causes of write amplification in an SSD. Other causes of write amplification can include wear leveling, over-provisioning, etc. Write amplification is undesirable because it can consume channel bandwidth and reduce the lifespan of a SSD.

FIG. 1 shows a process of write request execution in a flash memory device and garbage collection as a source of write amplification. There are two sources of write requests to the memory blocks. As can be seen in FIG. 1, one source of write requests is external write requests 102 from an external source, such as received user data. The other source of write requests is from internal write requests 104 generated by garbage collection operations, which will be described below. Write requests 102 and 104 are processed by data placement logic 106, which can be implemented on a memory controller. The data are then written to free data block 108 at the "front" of free block pool 110, which comprises multiple pages. After free data block 108 is written with data, it becomes part of a data block pool 112. A block selection logic for garbage collection 114 is configured to select a data block from data block pool 112 that has the least number of valid pages and subsequently perform garbage collection on the selected data block. During garbage collection, valid data pages in the selected data block are read to generated internal write requests 104. The erased block then enters the queue of the free block pool 110.

DETAILED DESCRIPTION

Figure 1:
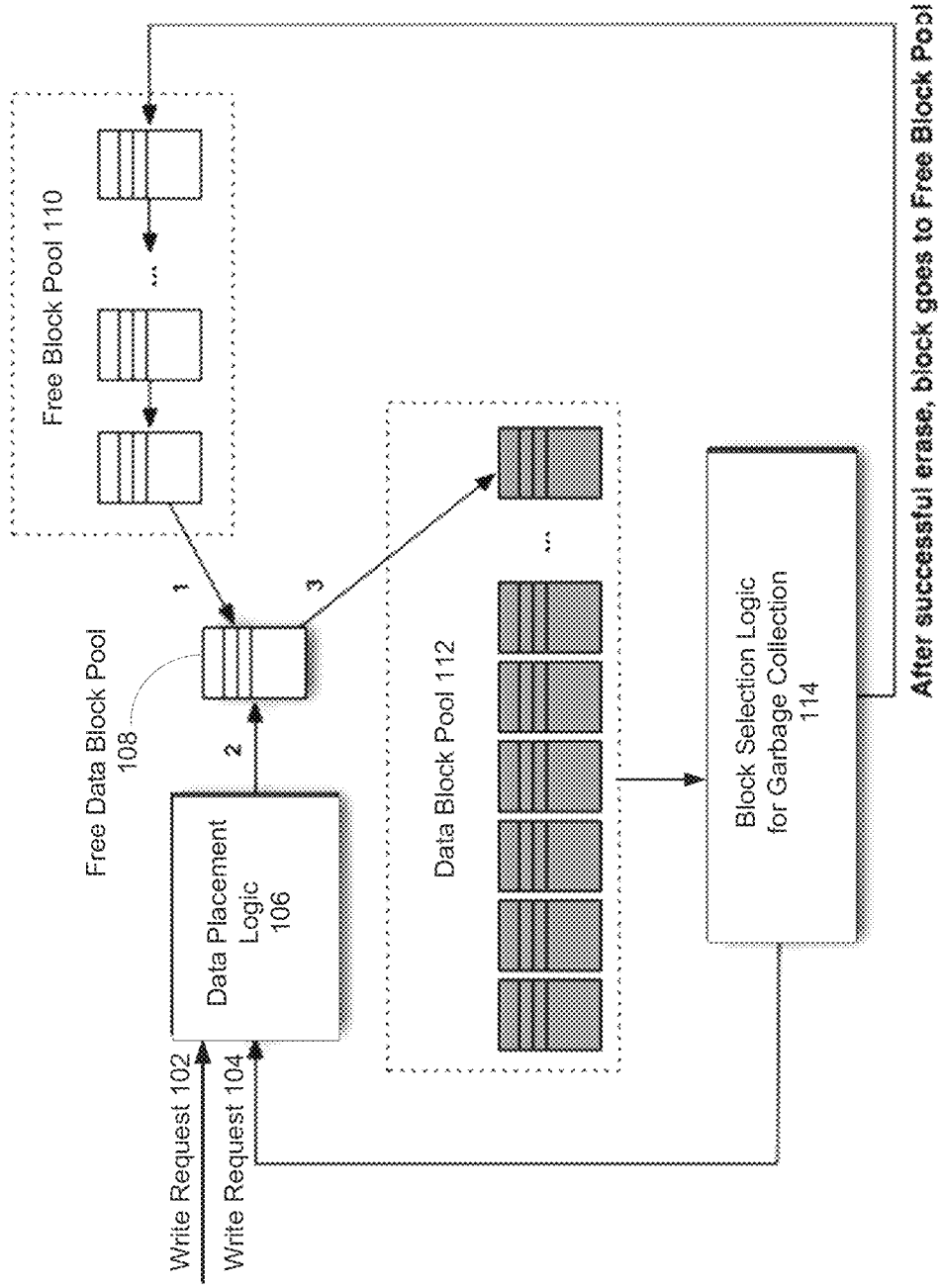
FIG. 1 illustrates process of write request execution in a flash memory device and garbage collection as a source of write amplification.

Disclosed are embodiments for improving channel performance in a storage device, such as a flash memory or a flash-based solid state drive, by dynamically provisioning available data channels for both write and read operations. In one aspect, a set of available data channels of a flash-based storage device is partitioned into a set of write channels and a set of read channels according to a read-to-write ratio. Next, when an incoming data stream of mixed read and write requests arrives at the storage device, the allocated read channels process the read requests on a first group of memory blocks, which does not include garbage collection on the first group of memory blocks. In parallel, the allocated write channels process the write requests on a second group of memory blocks, which includes garbage collection on the second group of memory blocks. In this manner, the overall write amplification on the storage device is reduced, and because the read requests and garbage collection requests are processed independently and in parallel, the channel bandwidth is significantly increased. In some embodiments, the read-to-write ratio is dynamically (e.g., at execution time) determined based on the incoming data stream write/read characteristics. Moreover, the partitioning of data channels into read channels and write channels according to the read-to-write ratio can vary across the set of data channels over time in a rotating manner, a random manner, etc. As a result, garbage collection operations can occur on different groups of memory blocks over time.

In various embodiments, a technique for improving channel performance in a storage device includes the partitioning a set of available data channels of the storage device into a set of read channels and a set of write channels according to a read-to-write ratio; receiving an incoming data stream of mixed read requests and write requests at the storage device; and executing the read requests on a first group of memory blocks of the storage device using the set of read channels while executing the write requests on a second group of memory blocks that is different from the first group of memory blocks using the set of write channels. In doing so, the execution of the read requests is not blocked by the write requests.

In some embodiments, prior to partitioning the set of available data channels, the read-to-write ratio is determined based on either historical incoming data patterns or a predicted incoming data pattern. In some embodiments, the read-to-write ratio is determined using a statistical ratio of number of read requests to number of write requests. In some embodiments, a set of read-to-write ratios is determined wherein each of the set of read-to-write ratios corresponds to a specific type of application. In some embodiments, the read-to-write ratio is dynamically adjusted so as to dynamically partition the set of available data channels into a set of read channels and a set of write channels. In some embodiments, executing the read requests on the first group of memory blocks does not include garbage collection and write amplification on the first group of memory blocks; whereas executing the write requests on the second group of memory blocks does include garbage collection and write amplification.

In some embodiments, after executing the read requests and the write requests, the set of available data channels is repartitioned into a second set of read channels and a second set of write channels according to the read-to-write ratio. In the new partition, at least one channel in the second set of read channels is not in the original set of read channels and at least one channel in the second set of write channels is not in the original set of write channels. A second incoming data stream of mixed read and write requests is then received at the storage device. The read requests in the second incoming data stream are executed on a third group of memory blocks of the storage device, which is at least partially different from the first group of memory blocks, using the second set of read channels. In parallel, the write requests in the second incoming data stream are executed on a fourth group of memory blocks, which is at least partially different from the second group of memory blocks, using the second set of write channels.

In some embodiments, a set of available data channels of the storage device are received, wherein each of the set of available data channels controls a unique set of memory blocks in the storage device; and a time-varying data channel partition scheme is determined that reparations a set of available data channels according to a specified time period. Subsequently, at various specified time periods, the time-varying data channel partition scheme is applied to the set of available data channels to obtain a set of read channels and a set of write channels according to a read-to-write ratio. Then the received read requests are executed on a first group of memory blocks of the storage device using the set of read channels while the received write requests are executed on a second group of memory blocks that is different from the first group of memory blocks using the set of write channels. In doing so, the execution of the read requests is not blocked by the write requests. In some embodiments, the time-varying data channel partition scheme is configured to perform a round-robin partition on the set of available data channels at consecutive, specified time periods. In some embodiments, the time-varying data channel partition scheme is configured to perform a random partition on the set of available data channels at consecutive, specified time periods. In some embodiments, the time period is dynamically adjusted so as to dynamically partition the set of available data channels into a set of read channels and a set of write channels.

In some embodiments, a storage device includes a controller, a set of data channels coupled to the controller, and a unique set of memory blocks coupled to the set of data channels. During operation, the controller is configured to partition the set of data channels into a set of read channels and a set of write channels according to a read-to-write ratio; receive an incoming data stream of mixed read requests and write requests at the storage device; and then assigning the read requests to the set of read channels and the write requests to the set of write channels. As a result, the read requests are executed on a first group of memory blocks coupled to the set of read channels while the write requests are independently executed on a second group of memory blocks coupled to the set of write channels. In this manner, the execution of the read requests is not blocked by the write requests. In some embodiments, the controller includes a buffer for storing a set of read-to-write ratios wherein each set of read-to-write ratios corresponds to a specific type of application. In some embodiments, the storage device includes a flash memory or a flash-based solid state drive. In some embodiments, the storage device includes a flash-based storage array system.

These and other aspects are described in greater detail in the drawings, the description and the claims.

Figure 2:
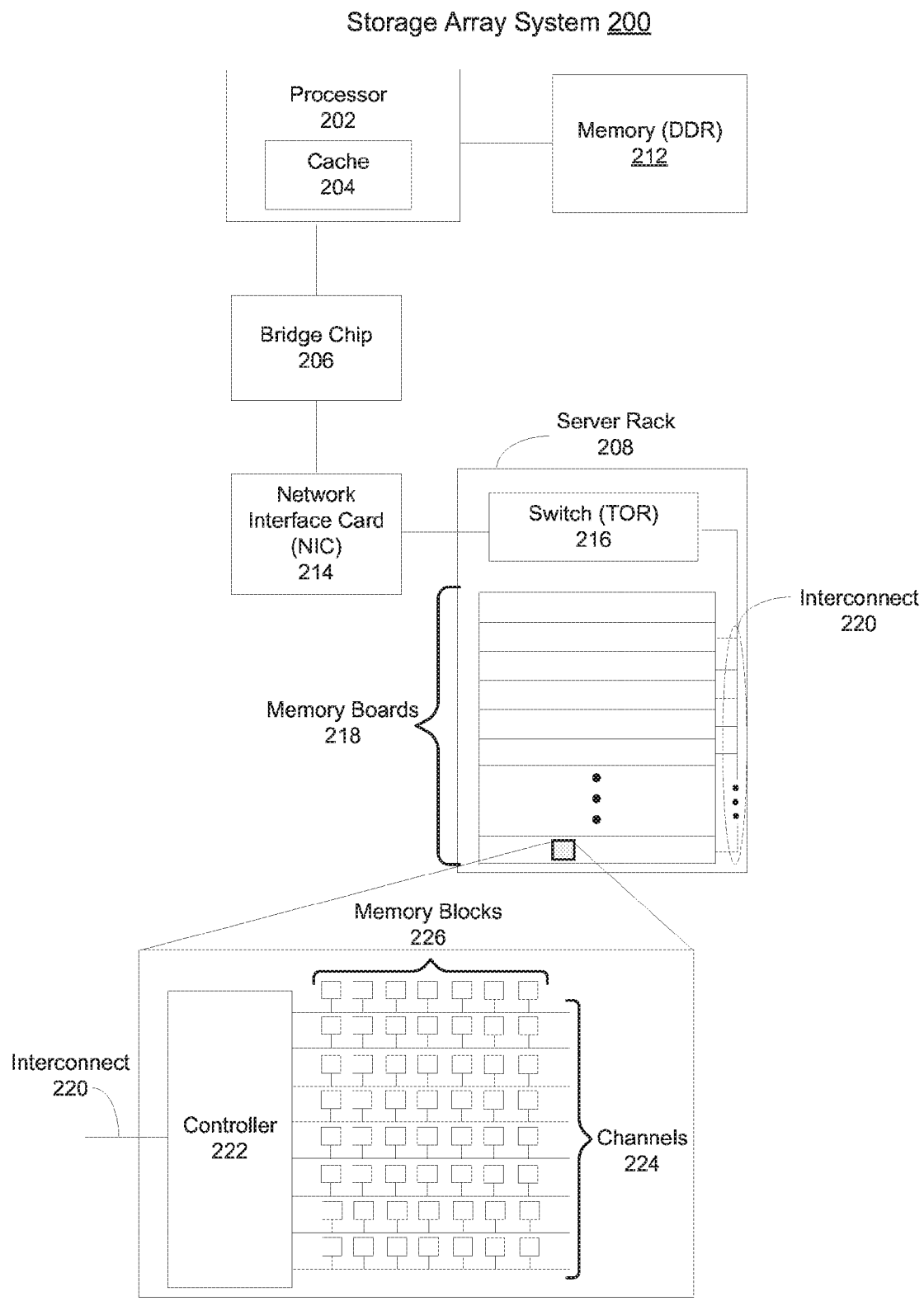
FIG. 2 illustrates a schematic diagram of a storage array system.

Solid state drives based on flash memory are gradually replacing disk drives as the preferred storage media in some devices, storage arrays such as SAN arrays. FIG. 2 illustrates a schematic diagram of a storage array system 200. As can been seen in FIG. 2, storage array system 200 includes a processor 202 that is coupled to a memory 212 and a network interface card (NIC) 214 through bridge chip 206. Memory 212 can include a dynamic random access memory (DRAM) such as a double data rate synchronous DRAM (DDR SDRAM), a static random access memory (SRAM), flash memory, read only memory (ROM), and any other type of memory. Bridge chip 206 can generally include any type of circuitry for coupling components of storage array system 200 together, such as a southbridge.

Processor 202 can include any type of processor, including, but not limited to, a microprocessor, a mainframe computer, a digital signal processor, a personal organizer, a device controller and a computational engine within an appliance, and any other processor now known or later developed. Furthermore, processor 202 can include one or more cores. Processor 202 includes a cache 204 that stores code and data for execution by processor 202. Although FIG. 2 illustrates storage array system 200 with one processor, storage array system 200 can include more than one processor. In a multi-processor configuration, the processors can be located on a single system board or multiple system boards.

Processor 202 communicates with a server rack 208 through bridge chip 206 and NIC 214. More specifically, NIC 214 is coupled a switch 216, such as a top of the rack (ToR) switch, within server rack 208. Server rack 208 further comprises a set of memory boards 218 that are individually coupled to switch 216 through an interconnect 220, such as a peripheral component interconnect express (PCIe) interconnect. Each memory board 218 contains a large number of controllers and memory blocks, such as flash memory blocks. The inset of FIG. 2 shows a unit of a memory board 218, which includes a single controller 222 coupled to interconnect 220. As can be seen, controller 222 supports a set of data channels 224, wherein each data channel 224 is coupled to a group of memory blocks 226. When memory boards 218 are based on flash memory, controller 222 manages the read, write, erase, wear-leveling, garbage collection and other operations on memory blocks 226, as well as communications with switch 216 and other system modules in storage array system 200 through interconnect 220.

In conventional memory management schemes, when data traffic comprising mixed read requests and write requests (e.g., Internet traffic associated with a web application, such as webmail or an online retailer) are routed from switch 216 to controller 222, controller 222 divides up the data traffic among the set of data channels 224, such that each of the data channels 224 receives a portion of the mixed read requests and write requests. During execution of the mixed read requests and write requests on a given channel, read requests have to wait for the completion of the write requests in the front of the queue, which causes read access delay. Moreover, in flash based devices, garbage collection takes places from time to time on the set of memory blocks 226. During garbage collection, the read requests cannot be executed until the garbage collection is completed, causing further read access delay. Note also that in these conventional memory management schemes, write amplification associated with garbage collection and other memory operations such as wear leveling and over-provisioning takes place on the set of memory blocks 226.

Embodiments can be employed in storage array system 200 to improve channel performances in memory boards 218. However, the disclosed techniques can generally operate on any type of storage device, storage system, or storage array system, and hence are not limited to the specific implementation of storage array system 200 as illustrated in FIG. 2.

More specifically, embodiments can be applied to any memory module that includes a controller and a set of channels (e.g., ranging from 8 to 32) for controlling a set of memory blocks. Typically, each channel controls a unique group of memory blocks. Conventionally, when data traffic comprising both read requests and write requests arrives at the memory controller, each channel would receive a subset of the data traffic that includes both read requests and write requests. This has a number of implications. First, this means that garbage collection, and hence write amplification, can occur on all the channels. Second, this means that on each channel, the execution of read requests is delayed by both write requests and garbage collection.

Embodiments partition the available data channels that are controlled by a memory controller on a memory device into a set of read channels and a set of write channels. Read requests and write requests are separated, wherein the read requests are assigned to and executed on the set of read channels while the write requests are assigned to and executed on the set of write channels. This significantly reduces the overall read access delay and improves channel performances. Moreover, the disclosed techniques can facilitate reducing write amplification in flash memory. We now describe the embodiments in additional detail.

In some embodiments, prior to partitioning a set of data channels controlled by a memory controller, a read-to-write ratio representing a statistical estimate of read requests to write requests that comprise incoming data traffic is first determined. For example, a 70/30 read-to-write ratio can represent a statistical estimate that 70% of time the set of data channels are occupied by read requests and 30% of time the data channels are occupied by write requests. Other example read-to-write ratios can include 60/40, 50/50, etc.

When determining the read-to-write ratio, the system can adjust the length of the time during which the historical data traffic is analyzed. In some embodiments, the read-to-write ratio is determined by using a statistical ratio of number of read requests to number of write requests generated from historical incoming data traffic. Embodiments can also dynamically adjust the read-to-write ratio by including the most recent data traffic in the statistical estimation. The updated read-to-write ratio estimate can then replace the previous read-to-write ratio estimate. Using a dynamically adjusted read-to-write ratio in channel partition allows for dynamically partitioning the set of available data channels into write channels and read channels. In a further embodiment, multiple read-to-write ratio values can be pre-computed and stored in a buffer such that each of the read-to-write ratio values corresponds to a particular type of application (e.g., different read-to-write ratio values for webmail, social networking, and online retail apps). Hence, a memory controller can select a corresponding read-to-write ratio from the buffer for the channel partition based on the particular application associated with the memory requests.

During memory operations, the set of available channels managed by the controller is partitioned according to the read-to-write ratio into two subsets of channels, namely, a set of read channels and a set of write channels. Moreover, the partition of the set of channels according to the read-to-write ratio varies according to time. For example, the time is set to a predetermined time period, and the set of channels is repartitioned according to each new time period. The controller separates the received data traffic, including mixed read requests and write requests, into received read requests for read access and received write requests for write access. During the time period associated with a given channel partition, the controller assigns the received read requests to the set of read channels while assigning the received write requests to the set of write channels. Hence, the write requests are executed on the set of memory blocks controlled by the set of write channels while the read requests are executed on the set of memory blocks controlled by the set of read channels. Because the two set of memory blocks do not overlap, the read requests can be handled without being blocked by the write requests. In some embodiments, garbage collection operations and other memory operations involving write amplification take place on the set of memory blocks associated with the set of write channels. In the example of a 70/30 partition, this means that only 30% of the memory blocks are included in garbage collection operations or contribute to write amplification. Thus, such garbage collection operations do not block the read requests being processed on a different set of memory blocks.

In some embodiments, after the set of available channels is partitioned into a set of write channels and a set of read channels, the partition channels are used to process the read requests and write requests independently during the associated time period $t_1=T$. At the beginning of the next time period $t_2=T$, the set of available channels is repartitioned into a new set of read channels and a new set of write channels according to the read-to-write ratio, and the new partition is used to process the read requests and write request independently during the associated time period $t_2$. In the new partition, at least one channel in the set of read channels is not in the previous partition of the read channels and at least one channel in the new set of write channels is not in the previous partition of the write channels. The repartitioning of the set of available channels takes place for each successive time period, wherein two consecutive partitions of the set of available channels are not identical. In this manner, both read requests and write requests do not target the same set of memory blocks in two consecutive time periods. Note that the proposed time-varying partitioning of the set of available channels can use different partitioning schemes. For example, the partitioning scheme can rotate through the set of available channels in a particular order during different time periods, or the partitioning scheme can randomly select channels as read channels or write channels for each time period. More details regarding the partitioning scheme are described below. Moreover, while an equal time period T can be used to define time-varying partitions, other embodiments can use time-varying time intervals in successive partitions.

Figure 3:
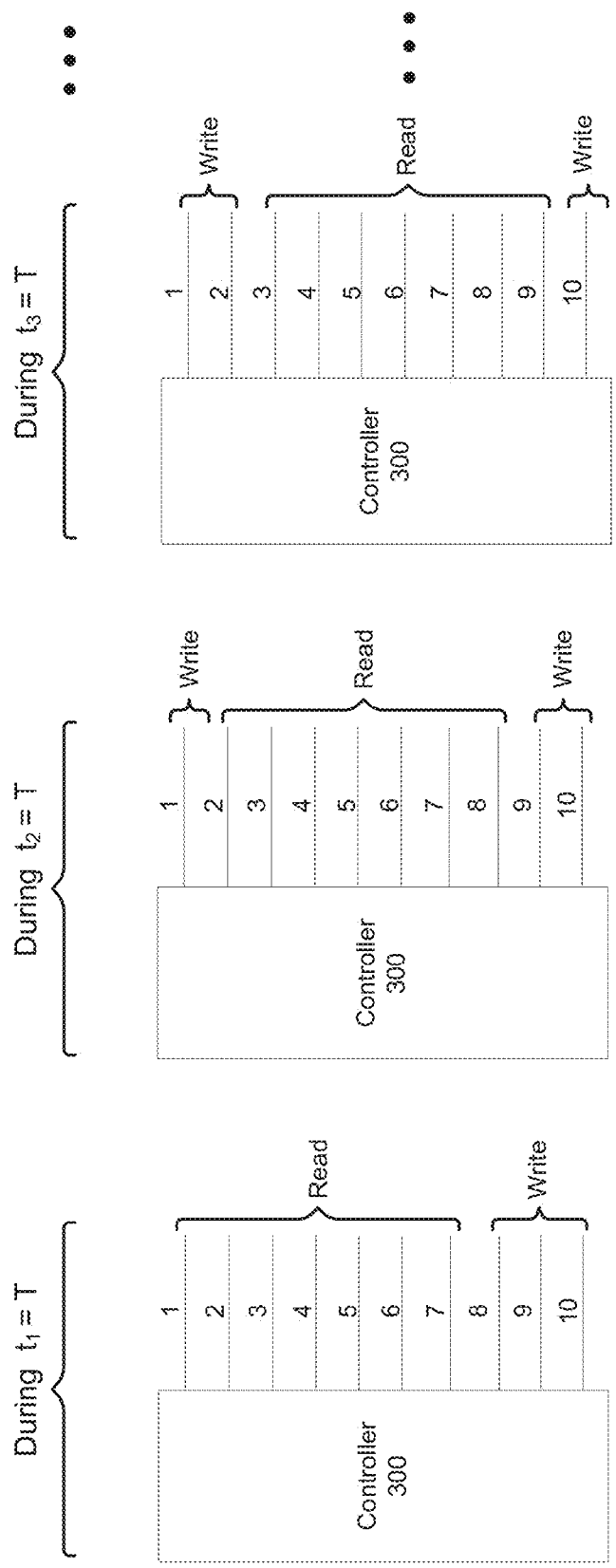
FIG. 3 illustrates a scheme for partitioning a set of data channels of a memory controller.

FIG. 3 illustrates a scheme for partitioning a set of data channels of a memory controller 300. As can be seen in FIG. 3, controller 300 controls 10 channels designated as #1 to #10. Note that other embodiments can have fewer or more channels per controller. During a time period $t_1=T$, the 10 channels are partitioned according to a 70/30 ratio such that channels 1-7 are allocated as read channels while channels 8-10 are write channels. During the subsequent time period $t_2=T$, the same 10 channels are repartitioned according to the 70/30 ratio such that the read channels are shifted by 1, i.e., channels 2-8 are allocated as read channels while channels 9, 10 and 1 are write channels. During the next time period $t_3=T$, the same 10 channels are repartitioned according to the 70/30 ratio such that channels 3-9 are allocated as read channels while channels 10, 1 and 2 as write channels. This reparation scheme of shifting the channels incrementally by one is repeated at successive time periods of duration T in the illustrated round-robin manner.

Note that the partitioning scheme of FIG. 3 represents a particular round-robin scheme wherein a new partition shifts the channels incrementally by one from the previous partition each time. However, other partitioning schemes based on different round-robin arrangements can be used to partition the set of channels over time. For example, a new partition can shift by more than one channel from the previous partition each time. In other embodiments, instead of partitioning the set of channels into consecutive read channels and write channels as shown in FIG. 3, the read channels and write channels can be staggered (e.g., channels 1, 2, 4, 5, 7, 8, 10 for reading, and channels 3, 6, 9 for writing) while a round-robin scheme is applied over time (e.g., by shifting the previous partition incrementally by 1 channel each time). In other embodiments, instead of using an ordered round-robin partitioning scheme, the technique can randomly partition the set of channels into read channels and write channels. More specifically, at each given time interval, the set of available channels would be randomly divided into a set of read channels and a set of write channels based on the read-to-write ratio. The random nature of the partition would ensure a new assignment of read and write channels. Hence the set of associated memory blocks would be different from a previous assignment of read and write channels.

The time period T used in the partitioning scheme can be predetermined for a particular type of flash memory, and therefore different for different types of flash memory. For a given memory, the time period T can be specified by the application and then used throughout the memory operation. For example, the time period T can be determined so that it is no shorter than the time required to write a data block (e.g., the time period T can be approximately equal to two times the amount of time it takes to write a data block). In other embodiments, the time period T can be a dynamic parameter that can be adjusted and varied during the memory operation. For example, the time period T may be adjusted based on the real-time traffic pattern and can be lengthened or shortened to favor either read operations over write operations, or write operations over read operations.

As mentioned above, the proposed timing-varying controller channel partition can significantly improve channel performance in a memory device, such as those with flash memory. First, at any given time period, garbage collection and write amplification can take place on a first set of memory blocks coupled to the temporarily allocated write channels. Meanwhile, read requests are processed on a second set of memory blocks coupled to the temporarily allocated read channels, without being obstructed by the write requests, the garbage collection and the write amplification that are taking place on the first set of memory blocks. For example, when the read-to-write ratio is 70/30, only 30% of the memory blocks are subjected to garbage collection and write amplification at a given time period. The result significantly reduces read access latency. Second, by rotating or varying the channel partition over time, different groups of memory blocks can be utilized for the write requests, which also allows garbage collection operations to take place on different groups of memory blocks over time. Note that when using such a time-varying partitioning scheme, any read miss due to a given channel partition blocking the read request is only temporary. For example, in the example implementation of FIG. 3, any read miss may be shorter than 4 time periods.

Figure 4:
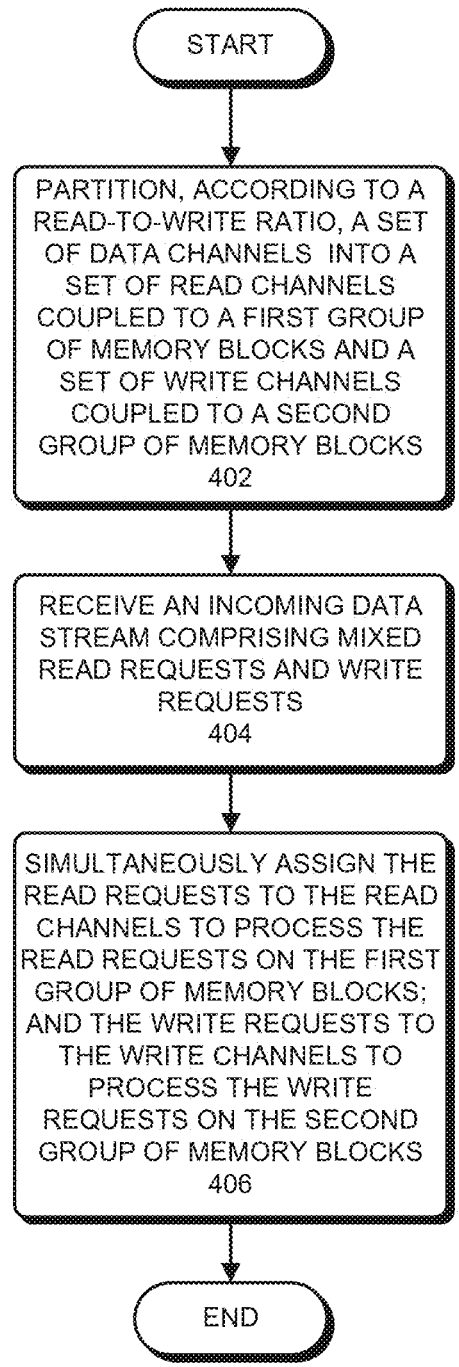
FIG. 4 is a flowchart illustrating a process for using channel partitioning to improve channel performance in a memory device.

FIG. 4 is a flowchart illustrating a process for using channel partitioning to improve channel performance in a memory device. During operation, a controller first partitions, according to a read-to-write ratio, a set of available data channels of the memory device into a set of read channels coupled to a first group of memory blocks and a set of write channels coupled to a second group of memory blocks that is different from the first group of memory blocks (step 402). The controller next receives an incoming data stream comprising mixed read requests and write requests (step 404). The controller then simultaneously assigns the read requests to the read channels, which process the read requests on the first group of memory blocks, and assigns the write requests to the write channels, which process the write requests on the second group of memory blocks (step 406). In this manner, the execution of the read requests on the first group of memory blocks is not blocked by the write requests and/or garbage collection on the second group of memory blocks. Note that prior to the channel partition, the controller can determine the read-to-write ratio based on either historical incoming data patterns or a predicted incoming data pattern. Moreover, the controller can dynamically update the read-to-write ratio based on newly arrived data traffic and subsequently use the updated read-to-write ratio for further channel partitioning.

Figure 5:
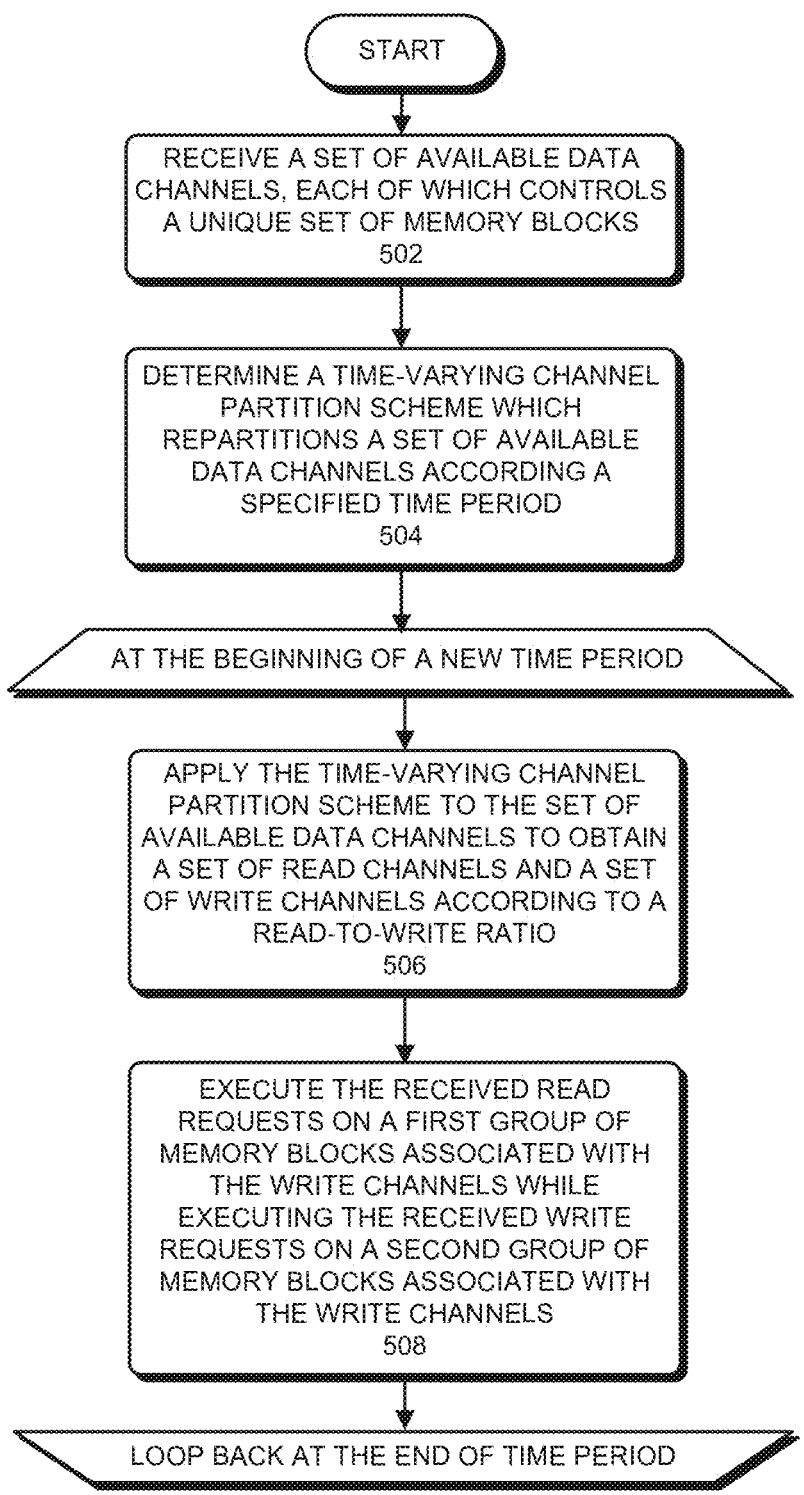
FIG. 5 is a flowchart illustrating a process for using a timing-varying channel partition scheme to improve channel performance in a memory device.

FIG. 5 is a flowchart illustrating a process for using a time-varying channel partition scheme to improve channel performance in a memory device. During operation, a controller first receives a set of available data channels on a memory device, such as a flash memory, wherein each of the set of available data channels controls a unique set of memory blocks in the memory device (step 502). The controller next determines a time-varying channel partition scheme that reparations a set of available data channels according to a specified time period (step 504). For example, the data channel partition scheme can include a round-robin partitioning of the set of available data channels at consecutive time periods. The time-varying data channel partition scheme can also include a random partitioning of the set of available data channels at consecutive time periods.

Subsequently, at each specified time period, the controller first applies the time-varying channel partition scheme to the set of available data channels to obtain a set of read channels and a set of write channels according to a read-to-write ratio (step 506). Then it executes the received read requests on a first group of memory blocks of the memory device associated with the set of read channels while executing the received write requests on a second group of memory blocks that is different from the first group of memory blocks associated with the set of write channels, whereby the execution of the read requests is not blocked by the write requests (step 508). The execution based on a given channel partition lasts through a given time period. Hence, at the beginning of each new time period, the set of available channels is repartitioned to obtain a set of read channels and a set of write channels that are different from the set of read channels and the set of write channels from the previous partition. Note that prior to the channel partition, the controller can determine the read-to-write ratio based on either historical incoming data patterns or a predicted incoming data pattern. Moreover, the controller can dynamically update the read-to-write ratio based on newly arrived data traffic and subsequently use the updated read-to-write ratio for further channel partitioning.

The above-described channel partitioning can be directly controlled by specially designed logic in the controller. Alternatively, the channel partitioning functions can be implemented into an Application Program Interface (API).

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include or be operatively coupled to receive data from or transfer data to, or both, one or more mass storage devices for storing data, e.g., magnetic, magneto optical disks, or optical disks. However, a computer need not have such devices. Computer readable media that is suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

While this patent document and attached appendices contain many specifics, these should not be construed as limitations on the scope of any invention or of what may be claimed, but rather as descriptions of features that may be specific to particular embodiments of particular inventions. Certain features that are described in this patent document and the attached appendices in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document and the attached appendices should not be understood as requiring such separation in all embodiments.

Only a few implementations and examples are described and other implementations, enhancements and variations can be made based on what is described and illustrated in this patent document and the attached appendices.

What is claimed is:

1. A method performed by a computing device having a processor and memory for improving channel performance in a storage device, comprising:
    partitioning, by the processor, a set of available data channels of the storage device into a set of read channels and a set of write channels according to a read-to-write ratio;
    receiving, at the storage device, an incoming data stream of mixed read requests and write requests; and
    executing the received read requests on a first group of memory blocks of the storage device using the set of read channels and executing the write requests on a second group of memory blocks that is different from the first group of memory blocks using the set of write channels, whereby the execution of the read requests is not blocked by the write requests.

2. The method of claim 1, wherein prior to partitioning the set of available data channels, the method further comprises determining the read-to-write ratio based on either historical incoming data patterns or a predicted incoming data pattern.

3. The method of claim 2, wherein determining the read-to-write ratio based on historical incoming data patterns includes using a statistical ratio of a number of read requests to a number of write requests.

4. The method of claim 2, wherein determining the read-to-write ratio based on historical incoming data patterns includes determining a set of read-to-write ratios wherein each of the set of read-to-write ratios corresponds to a specific type of application.

5. The method of claim 1, wherein the method further comprises dynamically adjusting the read-to-write ratio so as to dynamically partition the set of available data channels as a set read channels and a set of write channels.

6. The method of claim 1,
    wherein executing the read requests on the first group of memory blocks does not include garbage collection and write amplification on the first group of memory blocks; and
    wherein executing the write requests on the second group of memory blocks includes garbage collection and write amplification on the second group of memory blocks.

7. The method of claim 1, wherein the storage device includes a flash memory or a flash-based solid state drive.

8. The method of claim 1, wherein after executing the read requests and the write requests, the method further comprises:

repartitioning the set of available data channels into a second set of read channels and a second set of write channels according to the read-to-write ratio, wherein at least one channel in the second set of read channels is not in the set of read channels and at least one channel in the second set of write channels is not in the set of write channels;

receiving a second incoming data stream of mixed read requests and write requests at the storage device; and executing the read requests in the second incoming data stream on a third group of memory blocks of the storage device, which is at least partially different from the first group of memory blocks, using the second set of read channels, while executing the write requests in the second incoming data stream on a fourth group of memory blocks, which is at least partially different from the second group of memory blocks, using the second set of write channels.

9. A non-transitory computer-readable memory storing instructions for improving channel performance in a storage device, comprising:

instructions for receiving a set of available data channels of the storage device, wherein each of the set of available data channels controls a unique set of memory blocks in the storage device;

determining a time-varying data channel partition scheme that repartitions a set of available data channels according to a specified time period; and at each specified time period:

instructions for applying the time-varying data channel partition scheme to the set of available data channels to obtain a set of read channels and a set of write channels according to a read-to-write ratio; and instructions for executing read requests on a first group of memory blocks of the storage device using the set of read channels while executing write requests on a second group of memory blocks that is different from the first group of memory blocks using the set of write channels, whereby the execution of the read requests is not blocked by execution of the write requests.

10. The non-transitory computer-readable memory of claim 9, wherein the time-varying data channel partition scheme is configured to perform a round-robin partition on the set of available data channels at consecutive specified time periods.

11. The non-transitory computer-readable memory of claim 9, wherein the time-varying data channel partition scheme is configured to perform a random partition on the set of available data channels at consecutive specified time periods.

12. The non-transitory computer-readable memory of claim 9, wherein the instructions further comprise, prior to applying the time-varying data channel partition scheme to the set of available data channels, determining the read-to-write ratio based on either historical incoming data patterns or a predicted incoming data pattern.

13. The non-transitory computer-readable memory of claim 12, wherein determining the read-to-write ratio based on historical incoming data patterns includes using a statistical ratio of a number of read requests to a number of write requests.

14. The non-transitory computer-readable memory of claim 9, wherein the instructions further comprise dynamically adjusting the specified time period so as to dynamically partition the set of available data channels into the set of read channels and the set of write channels.

15. The non-transitory computer-readable memory of claim 9, wherein executing the read requests on the first group of memory blocks does not include garbage collection and write amplification on the first group of memory blocks; and wherein executing the write requests on the second group of memory blocks includes garbage collection and write amplification on the second group of memory blocks.

16. A data storage device, comprising:

a controller;

a set of data channels coupled to the controller; and a unique set of memory blocks coupled to each of the set of data channels;

wherein the controller is configured to:

partition the set of data channels into a set of read channels and a set of write channels according to a read-to-write ratio;

receive an incoming data stream of mixed read requests and write requests at the data storage device; and assign the read requests to the set of read channels and the write requests to the set of write channels;

wherein the read requests are executed on a first group of memory blocks coupled to the set of read channels while the write requests are independently executed on a second group of memory blocks coupled to the set of write channels, whereby the execution of the read requests is not blocked by the write requests.

17. The data storage device of claim 16, wherein the controller includes a buffer for storing a set of read-to-write ratios wherein each of the set of read-to-write ratios corresponds to a specific type of application.

18. The data storage device of claim 16, wherein executing the read requests on the first group of memory blocks does not include garbage collection and write amplification on the first group of memory blocks; and wherein executing the write requests on the second group of memory blocks includes garbage collection and write amplification on the second group of memory blocks.

19. The data storage device of claim 18, wherein the data storage device includes a flash memory or a flash-based solid state drive.

20. The data storage device of claim 18, wherein the data storage device includes a flash-based storage array system.

* * * * *